REVERSIBLE MAGNETIC TAPE RECORDER WITH INDEPENDENT HEAD AND DRIVE MEANS FOR SELECTIVE USE WITH ONE OR TWO TAPES

Filed March 23, 1965 2 Sheets-Sheet 1

United States Patent Office

3,415,956

Patented Dec. 10, 1968

3,415,956

REVERSIBLE MAGNETIC TAPE RECORDER WITH INDEPENDENT HEAD AND DRIVE MEANS FOR SELECTIVE USE WITH ONE OR TWO TAPES

Goji Uchikoshi, 582–33 Gakuen Higashi-machi, Kodaira, Tokyo, Japan

Filed Mar. 23, 1965, Ser. No. 441,986
Claims priority, application Japan, Mar. 26, 1964, 39/23,184
1 Claim. (Cl. 179—100.2)

ABSTRACT OF THE DISCLOSURE

A multipurpose tape recorder which has two head mechanisms each of which can function independently of the other to play back, record or erase signals on a magnetic tape thereby facilitating dubbing signals from a first tape on a second tape without recourse to using a second tape recorder unit. The tape recorder also can be used as a conventional reversible magnetic tape recorder. Each head mechanism is provided with its own drive means which can be operated independently of or simultaneously with the drive means of other other head mechanism.

The present invention relates to a reversible type magnetic tape recorder comprising two reel tables which are adapted to be driven in opposite directions to each other, two capstans and two sets of head mechanisms as principal components.

In the past, a dubbing operation in which signals recorded on one magnetic tape are regenerated on another magnetic tape, has necessitated use of two tape recorders which involves troublesome procedures.

A primary object of the present invention is to provide an improved reversible type magnetic tape recorder which can perform dubbing operation without use of a second tape recorder which has been necessary in the past thereby eliminating the troublesome procedure referred to above.

Another object of the present invention is to provide an electric change-over mechanism which enables a single magnetic tape recorder to perform the function expected for a conventional reversible magnetic tape recorder as well as the dubbing operation.

A preferred magnetic tape recorder according to the present invention comprises two driven reel tables, having own drive two capstans, two sets of head mechanisms, two auxiliary reel tables, electro-magnetic mechanisms adapted to cause two pinch rollers to abut against the associated capstans separately or simultaneously, and a change-over switch for controlling the above electro-magnetic mechanisms in accordance with the purpose for which the tape recorder is employed.

When the change-over switch is manipulated so as to cause one pinch roller to abut against a capstan, the tape recorder can perform the same function as a prior art tape recorder does, and on the contrary, when the change-over switch is manipulated so as to cause both pinch rollers to abut against their associated capstans, the tape recorder is rendered to a state ready for the dubbing operation.

The above and other objects and advantages of the present invention will be more readily apparent from the following description when read in connection with the accompanying drawings and in which.

Figure 1:
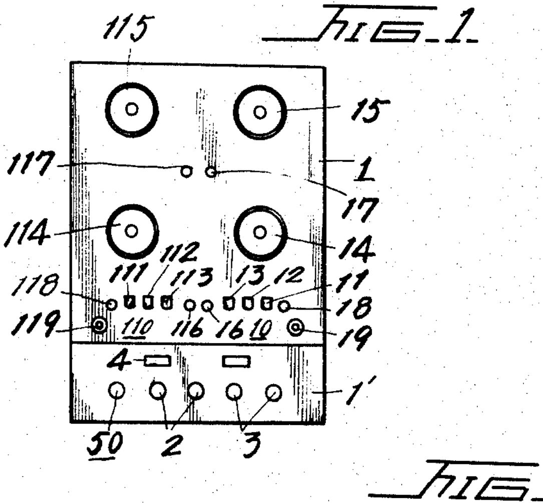
FIG. 1 is a top plan view of a preferred embodiment of a magnetic tape recorder constructed in accordance with the present invention, none of four reel tables on the tape recorder having tape reels mounted thereon.
Figure 2:
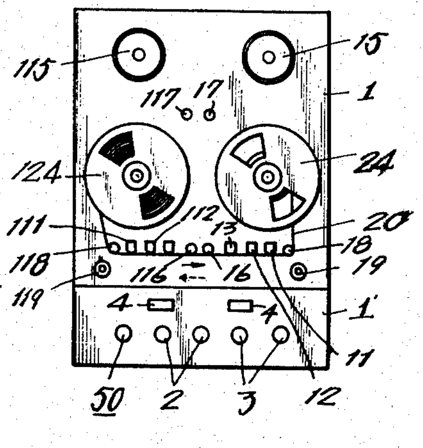
FIG. 2 is similar to FIG. 1, but showing two of the four reel tables having tape reels mounted thereon.

Referring now to FIG. 1, the magnetic tape recorder of the present invention comprises a body which is generally indicated by numeral reference 1, and on which there are one unit of head mechanism 10 comprising a play-back head 11, a recording head 12, and an eraser head 13; another unit of head mechanism 110 comprising a play-back head 111, a recording head 112, and an eraser head 113; reel tables 14 and 114 which are adapted to be positively rotatably driven in opposite directions to each other; auxiliary reel tables 15 and 115 which are rotatably mounted but not connected with a positive drive means; tape guides 16, 116, 17 and 117; capstans 18, 118; and pinch rollers 19, 119. The body 1 is formed with an integral extension 1' and disposed on the extension are a rotary change-over switch 50 for actuating the magnetic tape recorder, a pair of volume control knobs 2 for a recording amplifier disposed within the body 1, a pair of volume control knobs 3 for a play-back amplifier disposed within the body 1, and a pair of recording level meters 4. The rotary change-over switch 50 is so arranged that it can be shifted to positions in which either one of the pinch rollers 19 and 119 is caused to abut against its respective capstan 18 or 118, or to a position in which both the pinch rollers 19 and 119 are simultaneously caused to abut against their associated capstans 18 and 118, respectively, whereby the magnetic tape recorder may be operated under different conditions. Therefore, as shown in FIG. 2, when tape reels 24 and 124 (the latter has a magnetic tape 20 thereon) are mounted on two reel tables 14 and 114, respectively and after the lead end of the tape has been anchored to the reel 24 the rotary change-over switch 50 is shifted to one position so as to cause the pinch roller 19 to abut against the capstan 18 and then the tape reel 24 is driven so as to drive the tape 20 thereon in the direction indicated by the solid arrow line in FIG. 2. If the magnetic tape 20 has not been recorded, signals thereon the recording head 12 records signals on the tape whilst if the tape has been recorded signals therein the play-back head 11 initiates its regenerating function. Alternatively, when the rotary change-over switch 50 is shifted to a second "on" position so as to cause the pinch roller 119 to abut against the capstan 118 and the tape roller 124 is driven (in this case the tape roller 24 has the magnetic tape 20 wound thereon and the lead end of the tape has been anchored to the tape reel 124) so as to drive the tape 20 in a direction opposite to the arrow. If the magnetic tape has not been recorded, the recording head 112 records signals on the tape whilst if the tape has been recorded the play-back head initiates its regenerating operation. The head mechanisms 10 and 110 should be, of course, adapted to act on the different tracks on a magnetic tape, respectively. Alternatively, when the tape reels 24 and 25 are respectively mounted on the reel tables 14 and 15 and the magnetic tape 20 is trained around the tape guide 17, 16, the various heads 13, 12 and 11 of the head mechanism 10 and the capstan 18 while the tape reels 124 and 125 are respectively mounted on the reel tables 124 and 125 and another magnetic tape 120 is trained around the tape guide 117, 116, the various heads 113, 112 and 111 of the head mechanism 110 and the capstan 118, and thereafter the rotary change-over switch 50 is shifted to a position so as to cause the pinch rollers 19, 119 to simultaneously abut against the capstans 18 and 118 and the tape reels 24 and 124 are driven whereby the tapes 20 and 120 are driven in the solid arrow directions, respectively in FIG. 3. Thus, the magnetic tapes 20 and 120 on the tape reels 25 and 125 are wound onto the tape reels 24 and 124, respectively. Therefore, when either one of the two tape reels 25 and 125 is wound with a recorded magnetic tape thereon while the other tape reel is wound with a non-recorded magnetic tape, the play-back head of the head mechanism which contacts with the recorded tape picks up recorded signals from the tape and the play-back head regenerates an output corresponding to the signals and the output is sent to an amplifier which amplifies the output. The amplified output is then imparted to the recording head whereby the signals corresponding to the signals recorded on the recorded tape are reproduced on the non-recorded tape. Thus, it is clear that the dubbing operation can be performed with but simple manipulation of the magnetic tape recorder.

Figure 4:
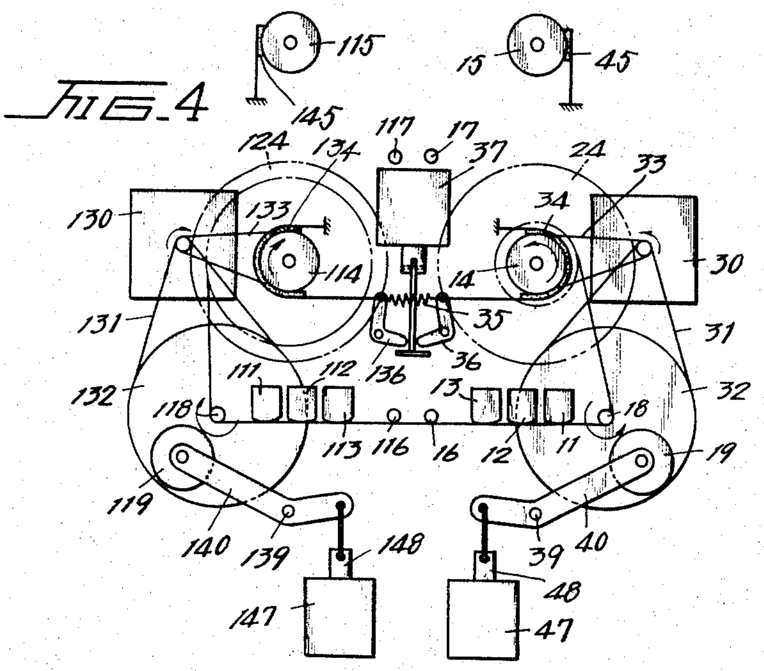
FIG. 4 is a top plan view of the magnetic tape recorder of FIG. 1 on an enlarged scale showing the details of a magnetic tape drive mechanism incorporated in the recorder.

FIG. 4 shows a preferred form of a magnetic tape drive mechanism suitably employed in the magnetic tape recorder as referred to above, and in this figure the reel tables 14 and 114 are shown as having tape reels 24 and 124 mounted thereon as in the case of FIG. 2. As seen in this figure, an electric motor 30 is connected by means of a slip belt 33 to the reel table 14 and the motor is also connected by means of a driving belt 31 to a fly wheel 32. The electric motor is normally rotated in the counter-clockwise direction and therefore, when the motor is rotated in that direction the fly wheel 32 is rotated in the same direction and accordingly, the capstan 18 is rotated in the counter-clockwise direction, the capstan 18 being fixed on the same shaft on which the fly wheel 32 is also mounted. The rotational movement of the motor 30 also causes the reel table 14 to rotate in the counter-clockwise direction through the movement of slip belt 33. The reel tables 14 and 114 have brake shoes 34 and 134 respectively which are pulled together through respective brake arms 36 and 136 by a brake spring 35. An electro-magnetic brake release mechanism 37 is positioned between the reel tables 14 and 114 within the body 1. When the brake release mechanism 37 is in the non-operative position, since the reel tables 14 and 114 are braked by the brake shoes 34 and 134 on which the brake spring 35 acts, the slip belt 33 slips around the reel table 14, and accordingly, the reel table will not rotate. However, when the brake release mechanism 37 is energized so as to pull a plunger 38 up which is part of the release mechanism and the head of which moves up and down within the brake mechanism, the brake shoes 34 and 134 are released by means of the brake arms 36 and 136 whereby the reel table 14 is driven by the slip belt 33 in the counter-clockwise direction.

An electric motor 130 for driving the reel table 114 is disposed within the body 1 and the motor is adapted to rotate in the clockwise-direction. The rotational movement of the electric motor 130 also causes its associated fly wheel 132 and capstan 118 to rotate in the clockwise-direction. The rotational movement of the electric motor 130 also causes the reel table 114 to rotate in the clockwise-direction through the movement of slip belt 133. When the reel table 114 is held in its braked position by the brake shoe 134, the slip belt 133 slips around the reel table 114 and the reel table does not rotate, but when the electro-magnetic mechanism 37 is energized so as to release the brake shoe 134 the reel table 114 is rotated in the clockwise-direction by the electric motor 130 through the movement of slip belt 133.

The pinch roller 19 which is adapted to abut against the capstan 18 and the pinch roller 119 which is adapted to abuts against the capstan 118 are respectively attached at one end of the arms 40 and 140 which are pivoted at 39 and 139, respectively. The other ends of the arms 40 and 140 are connected to the plungers 48 and 148 of the respective electro-magnetic mechanisms 47 and 147. When either electro-magnetic mechanism 47 or 147 is energized, or both of these electro-magnetic mechanisms are simultaneously energized, either pinch roller 19 or 119 is caused to abut against its respective capstan 18 or 118, or both of these rollers are simultaneously caused to abut against the respective capstans 18 and 118.

The auxiliary reel tables 15 and 115 are adapted to have mounted thereon a tape reel which has a recorded tape thereon, and a non-recorded tape wound thereon, respectively, when dubbing operation is carried out with the magnetic tape recorder by the present invention. These auxiliary reel tables 15 and 115 are rotatable but are not connected with any positive drive means and are normally abutted by respective friction shoes 45 and 145 with a suitable pressure when these auxiliary reels are in their non-operative position.

Figure 5:
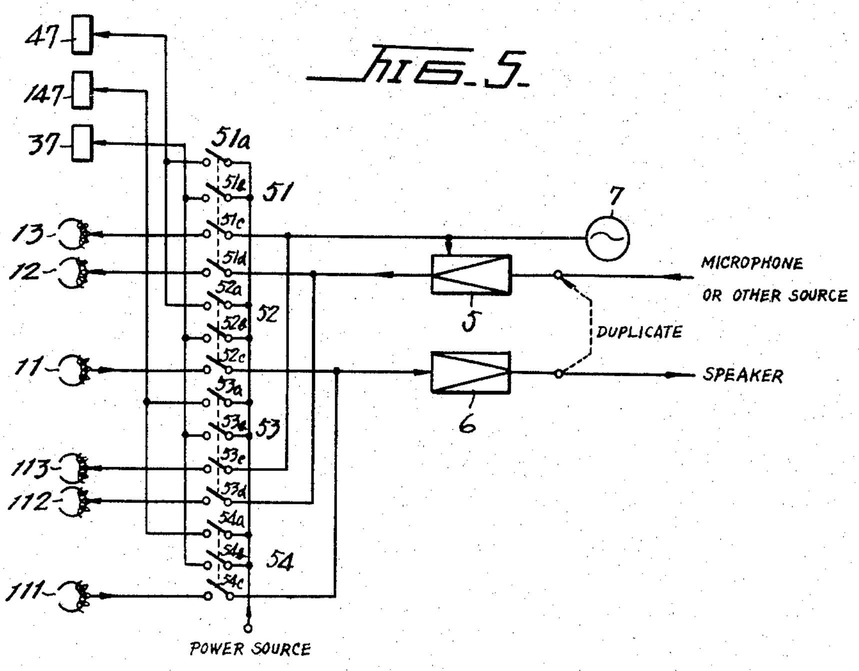
FIG. 5 is a view of a control circuit for the magnetic tape recorder.

FIG. 5 shows the electric circuit for and energizing respective electro-magnetic mechanisms 47, 147 and 37 of FIG. 4 for actuating the rotary change-over switch. The change-over switch is adapted to connect the play-back heads, recording heads and eraser heads of the pair of head mechanisms to a play-back amplifier, a recording amplifier and a high frequency erasing oscillator respectively.

In FIG. 5, the rotary change-over switch 50 is shown as comprising a normal operation-recording key 51, a normal operation-play-back key 52, a reverse operation-recording key 53, a reverse operation-play-back key 54. Each of the recording keys 51 and 53 has four contact points and each of the play-back keys 52 and 54 has three contact points.

The recording amplifier, play-back amplifier and high frequency erasing oscillator are disposed within the body 1 of the novel magnetic tape recorder and they are indicated by numeral references 5, 6 and 7, respectively in FIG. 5.

Although power supply circuits for the electric motors 30 and 130 are not shown in FIG. 5, there motors 30 and 130 are adapted to rotate in opposite directions to each other when a power switch is shifted to the "on" position which is not shown, but connected between the recorder and a power source (not shown).

The recording key 51 is employed for normal operation of the novel tape recorder. When all the contact points of this recording key are closed, current flows from the power source through the contact point 51*a* to the electro-magnetic mechanism 47 to energize the mechanism and current also flows from the power source through the contact point 51*b* to the electro-magnetic mechanism 37 to energize the mechanism. Furthermore, erasing high frequency voltage is supplied from the high frequency oscillator 7 through the contact point 51*c* to the eraser head 13 and the output of the recording amplifier 5 is supplied through the contact point 51*d* to the recording head 12.

Thus, as explained in connection with FIG. 4, since the energization of the electro-magnetic mechanism 37 releases the brake shoes 34 and 134 from their contact with the reel tables 14, 114 and the energization of the electro-magnetic mechanism 47 causes the pinch roller 19 to abut against the capstan 18, the magnetic tape on the tape reel 124 advances to the right while being erased by the eraser head 13 and then being recorded with signals through the recording head 12. In this case, the reel tables 14 and 114 are imparted rotating moment from the respective motors 30, 130 through the slip belts 33 and 133 because the brake shoes 34 and 134 have been released from the reel tables. In this case, since the tape reel 124 mounted on the reel table 114 is pulled by the magnetic tape which is driven by the reel tape 14 and capstan 18 in the opposite direction to the rotating moment which is imparted thereto by the slip belt 133, the tape reel 24 can impart a suitable back tension on the magnetic tape.

The play-back key 52 shown in FIG. 5, is employed for normal regenerating operation (when the tape is driven to the right) and current is supplied from the power source through the contact points 52_a_ and 52_b_ to respective electro-magnetic mechanisms 47 and 37. The play-back head 11 is connected through the contact point 52_c_ to the play-back amplifier 6. Therefore, when the play-back key 52 is actuated, various electro-magnetic mechanisms are energized in the same manner as in the case in which the recording key 51 is actuated except that the play-back head 11 is connected to the play-back amplifier 6, and accordingly, the play-back head 11 regenerates signals recorded on the magnetic tape which is driven in the right direction.

When the recording key 51 and play-back key 52 are simultaneously actuated so as to close their contact points, various heads and electro-magnetic mechanisms operate exactly in the same way as in the case in which these keys are separately closed, the signals recorded on the magnetic tape by the recording head 12 are regenerated by the play-back head 11 at a time lag corresponding to the time which elapses as the magnetic tape moves from the recording head 12 to the play-back head 11 thereby to detect whether recording is positively performed or not.

The recording key 53 is employed for carrying out reverse direction recording (for driving the magnetic tape in the left direction), and when this key 53 is manipulated so as to close its contact points, current from the power source is supplied through the contact point 53_a_ to the electro-magnetic mechanism 147 and through the contact point 53_b_ to the electro-magnetic mechanism 37 whereby the electro-magnetic mechanisms 147 and 37 are energized. At the same time, a high frequency erasing voltage is supplied from the high frequency oscillator 7 through the contact point 53_c_ to the erasing head 113. Furthermore, the output from the recording amplifier 5 is supplied through the contact point 53_d_ to the recording head 112. Thereupon, the electro-magnetic mechanism 37 is energized and the brake shoes 34 and 134 are released thereby, and accordingly, the electro-magnetic mechanism 147 is energized and the pinch roller 119 is caused to abut against the capstan 118. Therefore, the magnetic tape on the tape reel 14 advances along various heads to the left while the signals on the tape being erased by the erasing head 113 and then recorded signals thereon by the recording head 112. In this case, the tape reel 124 on the reel table 114 is wound on the magnetic tape under a suitable tension, but the tape reel 24 on the reel table 14 is pulled by the magnetic tape in the opposite direction to the rotating moment imparted thereto by the slip belt 33, and accordingly, the magnetic tape has imparted thereto a suitable magnitude of back tension in the same way as in the case in which the recording key 51 is manipulated.

The play-back key 54 is employed for reverse playing-back operation (for driving the magnetic tape in the left direction), and when this key is manipulated so as to close its contact points, current is supplied from the power source through the contacts 54_a_ and 54_b_ to the electro-magnetic mechanisms 147 and 37, respectively and the play-back head 111 is connected through the contact point 54_c_ to the play-back amplifier 6, and accordingly, the play-back head 111 regenerates the signals recorded on the magnetic tape as the recorded tape is driven in the left direction by the manipulation of the play-back key 54.

When the recording key 53 and play-back key 54 are simultaneously manipulated to close their contact points, the signals recorded on the magnetic tape by the recording head 111 can be regenerated whereby the signals may be monitored.

Figure 3:
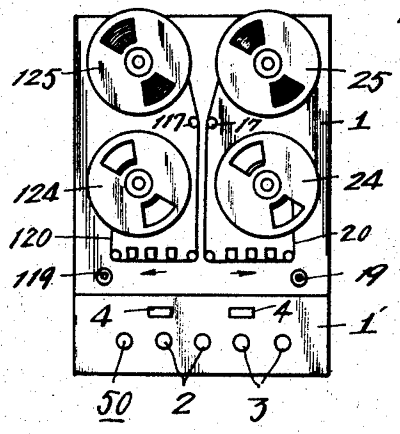
FIG. 3 is also similar to FIG. 1, but showing all of the four reel tables having tape reels mounted thereon, and also illustrating the manner in which magnetic tapes are wound around the tape reels for regenerating operation in the recorder.

Alternatively, when either one auxiliary reel table, for example, the auxiliary reel table 15, has mounted thereon a tape reel 25 on which a recorded magnetic tape has been laid whilst the other auxiliary reel table 115 has mounted thereon a tape reel 125 on which a non-recorded magnetic tape has been laid is mounted, and furthermore, when the reel tables 14 and 114 have mounted thereon take-up reels 24 and 124 and the magnetic tapes 20 and 120 are attached to the respective take-up reels as shown in FIG. 3, if the play-back key 52 and recording key 53 are simultaneously manipulated so as to close their contact points, the electro-magnetic mechanism 37 is energized to release the brake shoes 34 and 134 and at the same time the electro-magnetic mechanisms 47, 147 are energized so as to cause the pinch rollers 19 and 119 to abut against the respective capstans 18 and 118, whereby the magnetic tapes 20 and 120 are driven in the directions opposite to each other. In this case, the magnetic tapes 20 and 120 have imparted back tension thereto by the friction shoes 45 and 145 shown in FIG. 4. Therefore, when the output of the play-back head 11 which is in contact with the recorded tape 20 is applied through the play-back amplifier 6 to the recording amplifier 5 as an input and then the output from the recording amplifier 5 is applied to the recording head 112 which is in contact with the non-recorded tape 120, the signals which are exactly the same as on the magnetic tape 20 can be regenerated.

The above explanation concerns the case in which the tape reels 24 and 25 have wound thereon the recorded tape whilst the tape reels 124 and 125 have wound thereon the non-recorded tape, but alternatively, the tape reels 124 and 125 may be wounded thereon the recorded tape whilst the tape reels 24 and 25 may be wound thereon the non-recorded tape. In such an alternative arrangement, the signals which are exactly the same as those on the recorded tape 120 may be recorded on the non-recorded tape 20 by simultaneous manipulation of the play-back key 54 and recording key 51.

Although mechanisms for rapid feeding and rewinding of tapes have not been shown and described hereinabove because such mechanisms are well known in the art, these mechanisms are, of course, incorporated in the novel magnetic tape recorder.

While one specific embodiment of the present invention has been shown and described in detail, it will be understood that the same is for purpose of illustration only and is not to be taken as a definition of the scope of the invention, reference being had for this purpose to the appended claim.

What is claimed is:

1. In a multipurpose tape recorder which includes a recorder body having a pair of head mechanisms arranged therein in side by side relation with each head mechanism comprising means for recording, playing back and erasing signals on a magnetic tape, first and second reel tables each adapted to supportingly receive a tape reel thereon, a flywheel having a capstan mounted thereon, a pinch roller for pressing magnetic tape against said capstan to thereby feed tape from a reel mounted on said first reel table to a reel mounted on said second reel table and vice versa, drive means for selectively drivingly rotating at least one of the reel tables and the capstan of each head mechanism independently of and simultaneously with at least one of the reel tables and the capstan of the other head mechanism, said tape recorder further embodying a separate brake device associated with each driven reel table and normally biased by common spring means into engagement with the associated driven reel table to prevent said driven reel table from rotating and, means for selectively releasing said brake means, the improvements of said drive means comprising:

a separate electric drive motor associated with each head mechanism, the drive motor of one head mechanism normally rotating in a direction opposite to that of the drive motor of the other head mechanism, a separate drive belt connecting each drive motor with the corresponding flywheel, a separate slip belt connecting each drive motor with the corresponding driven reel table, said slip belt transmitting drive from said motor to said driven reel table when the brake means associated thereto is released, the means for selectively releasing said brake means comprising a pair of brake arms each pivoted intermediate the ends thereof and connected at one end with opposite ends of said spring, the other ends of said brake arms being in juxtaposition, an electromagnetic device having a plunger extending between the juxtaposed ends of said brake arms, said plunger being engageable against said juxtaposed ends for pivoting said brake arms in opposition to the bias of said spring when said electromagnetic device is energized thereby to release said brake devices, a pair of levers each mounting one of said pinch rollers at an end thereof, said levers being pivoted intermediate the ends thereof, the other ends of said levers being connected with electromagnetic devices which when energized pivot said levers to urge said pinch rollers into engagement with the corresponding capstans.

References Cited

UNITED STATES PATENTS

| | | | |
|---|---|---|---|
| 3,023,942 | 3/1962 | Bakos | 242—55.12 |
| 3,092,345 | 6/1963 | Clayton et al. | 242—55.12 |
| 3,295,853 | 1/1967 | Cheng | 179—100.2 |

BERNARD KONICK, *Primary Examiner.*

J. R. GOUDEAU, *Assistant Examiner.*

U.S. Cl. X.R.

242—55.12